United States Patent [19]

Tripodi

[11] Patent Number: 4,899,246
[45] Date of Patent: Feb. 6, 1990

[54] SOLID-STATE TRIP DEVICE COMPRISING A ZERO SEQUENCE CURRENT DETECTION CIRCUIT

[75] Inventor: Paul Tripodi, Eybens, France

[73] Assignee: Merlin Gerin, France

[21] Appl. No.: 162,592

[22] Filed: Mar. 1, 1988

[30] Foreign Application Priority Data

Mar. 9, 1987 [FR] France ................................ 87 03291

[51] Int. Cl.$^4$ ............................................... H02H 3/26
[52] U.S. Cl. ........................................ 361/44; 361/48; 361/85; 361/97
[58] Field of Search ..................................... 361/44–50, 361/95–97, 85, 86

[56] References Cited

U.S. PATENT DOCUMENTS

| 4,131,929 | 12/1978 | Moran | 361/97 |
| 4,347,540 | 8/1982 | Gary et al. | 361/47 |

FOREIGN PATENT DOCUMENTS 2344993  10/1977  France .

Primary Examiner—Todd E. DeBoer
Attorney, Agent, or Firm—Arnold, White & Durkee

[57] ABSTRACT

A signal representative of the zero sequence current is obtained from current transformers associated with each phase and with the neutral if applicable by separate summing, in two distinct conductors, of the positive half-wave currents and of the absolute value of the negative half-wave currents produced by the set of current transformers, the difference between the currents flowing through these two conductors being representative of the zero sequence current.

7 Claims, 3 Drawing Sheets

SOLID-STATE TRIP DEVICE COMPRISING A ZERO SEQUENCE CURRENT DETECTION CIRCUIT

BACKGROUND OF THE INVENTION

The invention relates to a solid-state trip device for a multipole electrical circuit breaker protecting an A.C. electrical supply system comprising:

a current sensor per pole, which generates a signal proportional to the current flowing through the associated conductor of the supply system protected by the circuit breaker;

a detection and rectification circuit to which said signals are applied to supply on the one hand signals representative of the currents flowing through the conductors to be protected and on the other hand a zero sequence signal if an insulation fault occurs;

an electronic processing unit to which the output signals from the detection and rectification circuit are applied to perform delayed and/or instantaneous tripping functions and delivering, with or without a time delay, a circuit breaker tripping order when preset thresholds are exceeded by the signals representative of the currents flowing through the conductors or by the zero sequence signal.

In state-of-the-art solid-state trip devices, a current transformer is associated with each of the conductors of the supply system to be protected, the signal it delivers being applied to a full-wave rectifier bridge, the rectified signals being used by an electronic processing unit to perform the long delay, short delay and/or instantaneous trip device functions. A ground fault is generally speaking detected either by means of an additional, summing, current transformer whose primary windings are constitute by the set of conductors of the supply system to be protected and whose secondary winding supplies a ground fault signal when the sum of the currents flowing through the primary windings is not nil, or by means of a measurement resistor arranged in a conductor common to one of the ends of each secondary winding of the current transformers associated with the different conductors.

SUMMARY OF THE INVENTION

The object of the invention is to achieve a solid-state trip device comprising a new, particularly simple means of detecting a ground fault.

According to the invention, the solid-state trip device is characterized in that the detection and rectification circuit comprises first rectification means producing a first signal representative of the sum of the positive half-waves of the output signals from the set of current sensors, second rectification means producing a second signal representative, in absolute value, of the sum of the negative half-waves of the output signals from the set of current sensors, and means effecting the difference between the first and second summed signals so as to produce said zero sequence signal.

According to a preferred embodiment, the detection and rectification circuit comprises a group of diodes associated with each current sensor, each group comprising a first and a second diode arranged in series and whose common point is connected to a first output of the associated current sensor, a third and a fourth diode arranged in series and whose common point is connected to a second output of the associated current sensor, the anodes of the second and fourth diodes being connected and their common point connected to a first conductor constituting the negative output potential of the detection and rectification circuit, the cathodes of the first diodes of the different groups being connected to a second conductor and the cathodes of the third diodes of the different groups being connected to a third conductor distinct from the second, means effecting the difference between the currents flowing through the second and third conductors, constituting respectively said first and second summed signals, so as to produce said zero sequence signal.

By inserting a measurement resistor between the common point of the anodes of the second and fourth diodes of each group and the first conductor, independent full-wave rectification of each phase and of the neutral can be achieved, the voltage at the terminals of this measurement resistor then being representative of the phase or neutral current.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
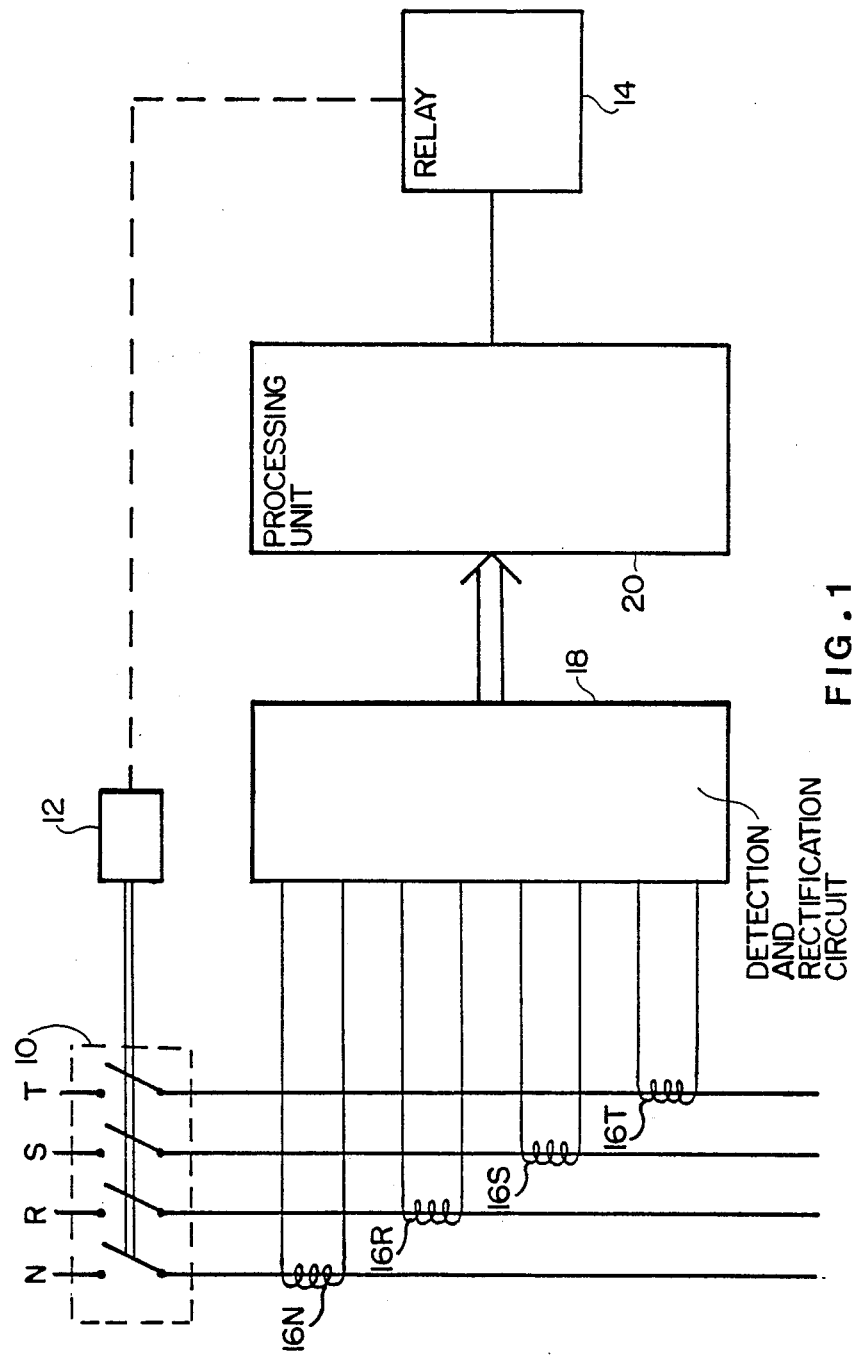
FIG. 1 is a block diagram of a solid-state trip device.

In FIG. 1, a circuit breaker 10 protecting the lines R, S, T and N of a three-phase plus neutral alternating current supply system is actuated by an operating mechanism 12 controlled by a polarized relay 14 in such a way as to bring about tripping of the circuit breaker if an overload, short-circuit or ground fault occurs.

The current intensity flowing through each line is detected by a current transformer 16R, 16S, 16T or 16N. The secondary windings of the current transformers, all running in the same direction, are connected to a detection and rectification circuit which supplies the electronic processing unit 20 of the trip device with signals representative of the phase, ground, and ground fault currents, and with a supply voltage in the case of a system-powered trip device The electronic processing unit 20 performs, in state-of-the-art manner, the long delay, short delay and instantaneous tripping functions in order to generate a circuit breaker tripping order when preset thresholds are exceeded. The tripping order thus generated is applied to the polarized relay 14 in order to actuate the circuit breaker.

Processing units of this kind are well-known in the art, whether they be of the analog type as in U.S. Pat. No. 4,571,659 or of the microprocessor-based digital type as in U.S. Patent application No. 4,710,845.

The electronic processing unit 20 also performs ground fault protection of the supply system from a zero sequence current measurement signal supplied to it by the circuit 18. If there is no insulation fault on the supply system, the zero sequence current is nil. An insulation fault occurring between an active conductor R, S, T, N of the supply system and a ground or earth gives rise to detection by the circuit 18 of a residual or zero sequence current. The processing unit 20 uses this zero sequence measurement signal to bring about instantaneous or delayed tripping of the circuit breaker, in a manner well-known in the art, when this measurement signal exceeds preset thresholds.

Figure 2:
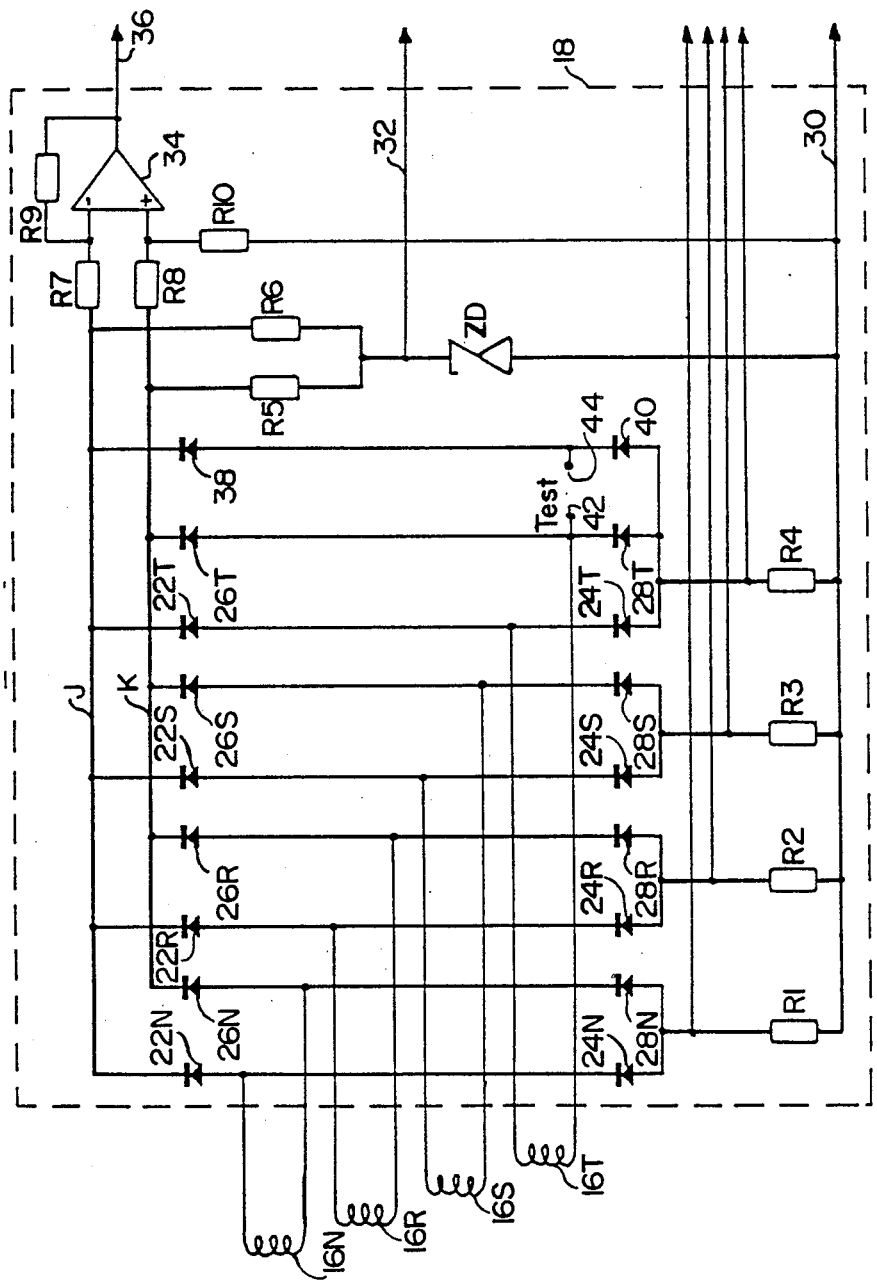
FIG. 2 represents a preferred embodiment of the detection and rectification circuit of the trip device according to FIG. 1.

FIG. 2 represents in greater detail a particular embodiment of the detection and rectification circuit 18 of the solid-state trip device according to FIG. 1, implementing the principles of the invention.

For a four-pole trip device, the circuit 18 comprises four groups of diodes associated respectively with one of the secondary windings of the current transformers 16R, 16S, 16T and 16N.

As the four groups are identical, only one of them will be described in greater detail, the same references completed by the letters R, S, T or N being used in FIG. 2 depending on whether the group involved is associated with line R, S, T or N. In each group, one of the ends of the secondary winding 16 is connected to the anode of a diode 22 and to the cathode of a diode 24, whereas the other end of the winding 16 is connected to the anode of a diode 26 and to the cathode of a diode 28.

The cathodes of all the diodes 22 (22R, 22S, 22T and 22N) are connected to one and the same conductor J whereas the cathodes of all the diodes 26 (26R, 26S, 26T and 26N) are connected to one and the same conductor K. The anodes of the diodes 24N and 28N are connected together and their common point is connected to a conductor 30 constituting the negative output potential of the circuit 18.

In the preferred embodiment represented in the figure, the connection of the diodes 24N and 28N to the conductor 30 is achieved by means of a measurement resistor R1. Similarly the common point of the anodes of the diodes 24R and 28R, 24S and 28S or 24T and 28T respectively, is connected by means of a measurement resistor R2, R3 or R4 respectively to the conductor 30. Due to this arrangement, the current flowing respectively in the resistors R1 to R4 corresponds to the rectified full-wave current of the associated current transformer. The resistors R1 to R4 are accurate measurement resistors of low value (a few ohms). These resistors, which are of the same value, convert the detected current signals into voltage signals. These voltage signals, negative with respect to the potential of the conductor 30 and constituting independent measurement signals on each phase, are used in a known manner by the processing circuit 20 to provide the long delay, short delay and instantaneous functions of the trip device. Although the embodiment represented is particularly simple, the invention is in no way limited to this embodiment and the signals representative of the currents flowing through the conductors (R, S, T, N) can be obtained in any state-of-the-art manner.

According to the invention, the conductors J and K are distinct so that the current Ij flowing through the conductor J corresponds to the sum of the positive half-waves of the currents detected by the current transformers 16, whereas the current Ik flowing through the conductor K corresponds, in absolute value, to the sum of the negative half-waves of the currents detected The difference Ih between the currents Ij and Ik can be considered as the image of the zero sequence current of the supply system. The conductors J and K are respectively connected to the conductor 30 by resistors R5 and R6, having the same value, in such a way that the voltage difference Vh existing between the conductors J and K is a representation of the zero sequence current.

In the particular embodiment represented in FIG. 2, the voltage Vh is applied to the terminals of a differential amplifier which supplies on output, on the line 36, a measurement voltage wnich can be used by the processing circuit 20 to trip the circuit breaker if a ground fault occurs. As represented in the figure, the conductor J is connected by means of a resistor R7 to the inverting input of an operational amplifier 34 whereas the conductor K is connected by means of a resistor R8, having the same value as R7, to the non-inverting input of the amplifier, the latter input being connected by a resistor R10 to the conductor 30. A feed-back resistor R9, having the same value as R10, is fitted between the inverting input and the output of the amplifier. A voltage proportional to Vh and, consequently, representative of the zero sequence current in the supply system to be protected, is thus obtained between the conductors 30 and 36.

In the preferred embodiment represented, the common point of the resistors R5 and R6 is connected to the conductor 30 by means of a Zener diode ZD, in such a way as to supply between the conductor 30 and a conductor 32 connected to said common point, a supply voltage used to supply the trip device which is under these conditions system-powered. Interposing this diode ZD has no influence on the measurement voltage Vh. Indeed, if V is the voltage at the terminals of the Zener diode ZD, the voltage Vh is given by:

$$Vh = Ij\,R6 + V - (Ik\,R5 + V) = Ij\,R6 - Ik\,R5$$

with R5 = R6 we in fact obtain: Vh = R5 (Ij − Ik).

In the preferred embodiment represented in FIG. 2, the trip device comprises two test terminals 42, 44 capable of operating in conjunction with an external fault simulator (not represented) designed to apply an artificial D.C. fault current to test operation of the trip device. A first test terminal 42 is connected to the common point of the diodes 26 and 28 of one of the groups of diodes, in the figure diodes 26T and 28T, whereas the second test terminal 44 is connected to the common point of two diodes 38 and 40 arranged in series between the conductor J and the anode of the diode 28 involved (i.e. 28T in the figure).

To test operation of the trip device overcurrent protection function, the external fault simulator is connected between the test terminals 42 and 44 in such a way that its positive polarity is applied to the terminal 44 and its negative polarity to the terminal 42. When a D.C. test current is applied to the trip device by the fault simulator, this current therefore flows from the terminal 44, through the diode 38, the conductor J, the resistor R6, the Zener diode ZD, the resistor R4 and the diode 28T and is output on the test terminal 42 The voltage existing at the terminals of the measurement resistor R4 is used to check correct operation of the electronic processing unit 20, notably the different long delay, short delay and instantaneous tripping functions. If a current is flowing through the conductor J whereas no current is flowing through the conductor K, a positive voltage difference is applied to the input of the operational amplifier 34, resulting in a negative voltage being output on the conductor 36. As the ground fault tripping threshold in the unit 20 is a positive threshold, this negative voltage does not cause the ground fault function to be actuated.

To test operation of the trip device ground fault protection function, the direction in which the test current is applied is reversed applying the positive polarity of the fault simulator to the terminal 42 and its negative polarity to the terminal 44. The D.C. test current then flows from the terminal 42, through the diode 26T, the conductor K, the resistor R5, the Zener diode ZD, the resistor R4 and the diode 40 and is output on the test terminal 44. The unbalance between the currents flowing through the conductors J and K creates a negative voltage difference at the terminals of the amplifier 34, resulting in a positive voltage signal on the conductor 36. This signal enables the ground fault protection threshold and time delay of the unit 20 to be tested. In this case, the test current intensity is comprised between the sensitivity of the ground fault tripping circuit and the image current corresponding to the rated current of the circuit breaker, in such a way that the test current flowing through the measurement resistor R4 has no effect on the unit 20, the voltage at the terminals of the resistor R4 remaining lower than the long delay tripping threshold of the unit 20. Thus reversing the direction of flow of the test current by simply changing the simulator polarity enables the ground fault protection and overcurrent protection functions of the trip device to be tested with a single pair of test terminals.

The test current must flow through one of the conductors J or K only, thus creating an unbalance, to enable the operation of the trip device ground fault function to be tested. It is quite obvious that this can be accomplished by other means than those represented in the figure. As an example, the first test terminal could be connected to the common point of the diodes 22 and 24 of a group, the other test terminal then being connected to the common point of two diodes arranged in series between the conductor K and the anode of the diode 24.

Although the invention has been represented in FIGS. 1 and 2 in its application to a three-phase plus neutral supply system, it is quite clear that it is not limited to this type of supply system. It can, on the contrary, be applied in the same way notably to a two-pole circuit breaker (comprising one phase and neutral) or a three-pole circuit breaker (without neutral).

Figure 3:
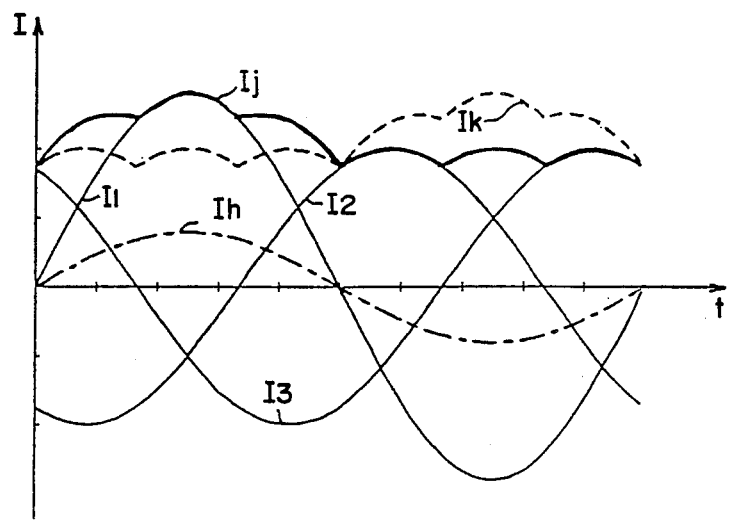
FIGS. 3 and 4 represent the wave shapes obtained using the principles of the present invention in a three-pole circuit breaker, without neutral.
Figure 4:
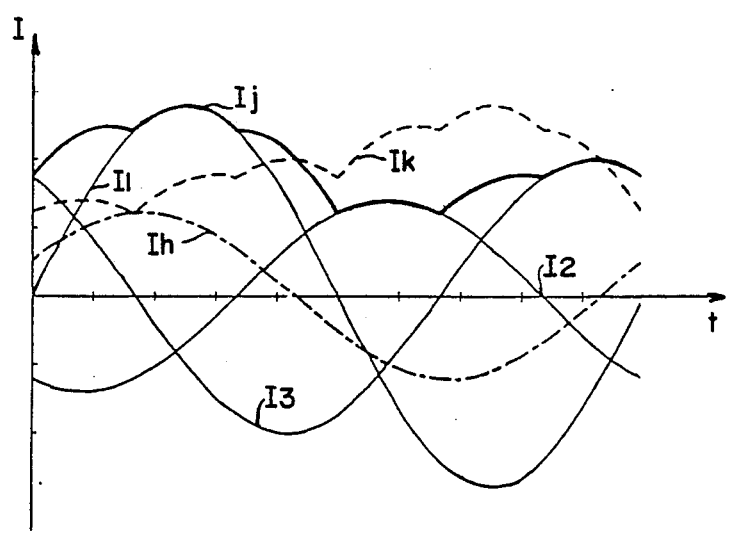

FIGS. 3 and 4 illustrate, as an example, the wave shapes obtained in a three-pole circuit breaker. In the figures, the currents I1, I2 and I3 in the three phases, the current Ij constituted by the sum of the positive half-waves, the current Ik constituted by the sum, in absolute value, of the negative half-waves and the zero sequence current Ih equal to the difference between Ij and Ik, have been represented.

In the case in FIG. 3 we have I1 = 14A, I2 = I3 = 10A whereas in the case in FIG. 4 we have I1 = 14A, I2 = 7A and I3 = 10A.

What is claimed:

1. A multipole electrical circuit breaker, protecting an A.C. electrical supply system, including a solid-state trip device, comprising:
   a current sensor per pole, which generates a signal proportional to the current flowing through the associated conductor of the supply system protected by the circuit breaker;
   a detection and rectification circuit to which said signals are applied to supply on the one hand signals representative of the currents flowing through the conductors to be protected and on the other hand a zero sequence signal if an insulation fault occurs; and
   an electronic processing unit to which the output signals from the detection and rectification circuit are applied to perform delayed and/or instantaneous tripping functions and delivering, with or without a time delay, a circuit breaker tripping order when preset thresholds are exceeded by the signals representative of the currents flowing through the conductors or by the zero sequence signal, wherein the detection and rectification circuit comprises first rectification means producing a first signal representative of the sum of the positive half-waves of the output signals from the set of current sensors, second rectification means producing a second signal representative, in absolute value, of the sum of the negative half-waves of the output signals from the set of current sensors, and means effecting the difference between the first and second summed signals so as to produce said zero sequence signal.

2. A multipole electrical circuit breaker, protecting an A.C. electrical supply system, including a solid-state trip device, comprising:
   a current sensor per pole, which generates a signal proportional to the current flowing through the associated conductor of the supply system protected by the circuit breaker;
   a detection and rectification circuit to which said signals are applied to supply on the one hand signals representative of the currents flowing through the conductors to be protected and on the other hand a zero sequence signal if an insulation fault occurs; and
   an electronic processing unit to which the output signals from the detection and rectification circuit are applied to perform delayed and/or instantaneous tripping functions and delivering, with or without a time delay, a circuit breaker tripping order when preset thresholds are exceeded by the signals representative of the currents flowing through the conductors or by the zero sequence signal, wherein the detection and rectification circuit comprises a group of diodes associated with each current sensor, each group comprising a first and a second diode arranged in series and whose common point is connected to a first output of the associated current sensor, a third and a fourth diode arranged in series and whose common point is connected to a second output of the associated current sensor, the anodes of the second and fourth diodes being connected and their common point connected to a first conductor constituting the negative output potential of the detection and rectification circuit, the cathodes of the first diodes of the different groups being connected to a second conductor and the cathodes of the third diodes of the different groups being connected to a third conductor distinct from the second, and means effecting the difference between the currents flowing through the second and third conductors, respectively constituting a first signal representative of the sum of the positive half-waves of the output signals from the set of current sensors and a second signal representative, in absolute value, of the sum of the negative half-waves of the output signals from the set of current sensors, so as to produce said zero sequence signal.

3. The circuit breaker according to claim 2, wherein said difference effecting means comprise first and second resistors of the same value respectively connecting the second and third conductors to the first conductor, the voltage difference between the second and third conductors being representative of the zero sequence current in the supply system.

4. The circuit breaker according to claim 3, wherein a differential amplifier is connected between the second and third conductors in such a way as to supply said zero sequence signal on output.

5. The circuit breaker according to claim 3, wherein the first and second resistors are connected to the first conductor by means of a Zener diode, the voltage at the terminals of the Zener diode providing a supply voltage for the electronic processing unit.

6. The circuit breaker according to claim 2, wherein in each group of diodes associated with a current sensor, the common point of the anodes of the second and fourth diodes is connected to the first conductor by means of a measurement resistor, the voltage at the terminals of said measurement resistor constituting the signal representative of the current flowing through the conductor associated with said current sensor and applied to the electronic processing unit.

7. The circuit breaker according to claim 2, comprising two test terminals to which a fault simulator capable of applying an artificial D.C. fault current can be connected to test operation of the trip device, wherein the test terminals are respectively connected to the second and third conductors in such a way that the D.C. current applied between said terminals only flows through one of said conductors in order to enable the ground fault function of the trip device to operate.

* * * * *